K. N. AVERY.
TRACTION WHEEL.
APPLICATION FILED AUG. 21, 1911.
1,036,537.
Patented Aug. 27, 1912.
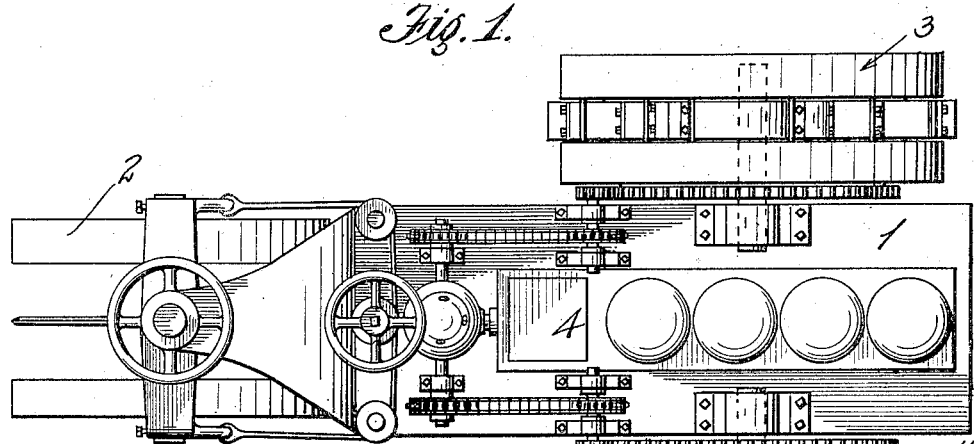
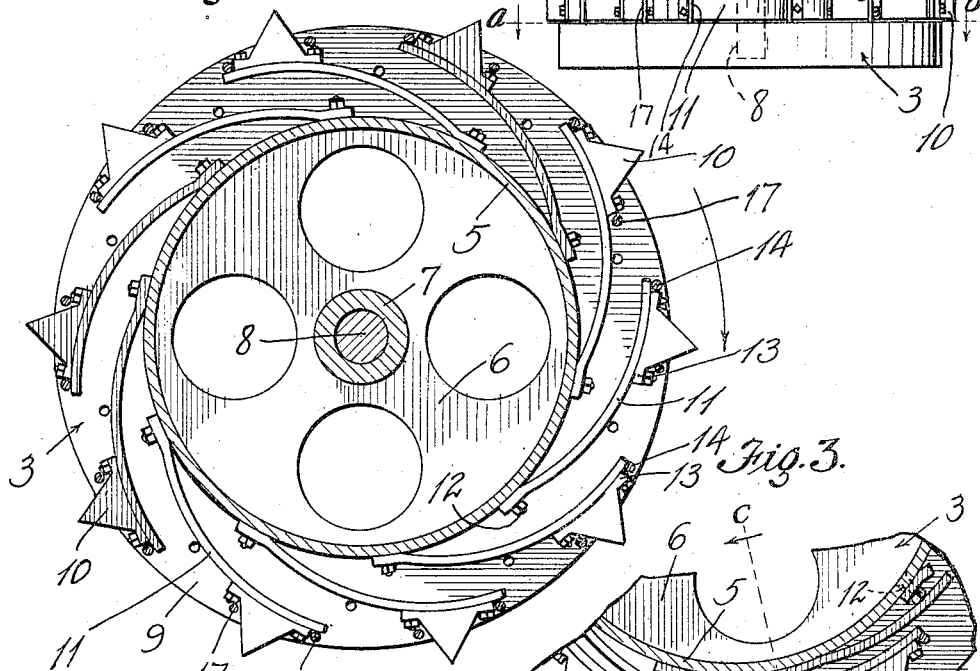
Witnesses
E. R. Pollard
C. Severance
Inventor
Kenneth N. Avery
by
Attys.

UNITED STATES PATENT OFFICE.

KENNETH N. AVERY, OF COVINA, CALIFORNIA.

TRACTION-WHEEL.

1,036,537.

Specification of Letters Patent. Patented Aug. 27, 1912.

Application filed August 21, 1911. Serial No. 645,142.

*To all whom it may concern:*

Be it known that I, KENNETH N. AVERY, a citizen of the United States, residing at Covina, county of Los Angeles, said State of California, have invented new and useful Improvements in Traction-Wheels, of which the following is a specification.

This invention relates to improvements in traction wheels and particularly to such as are adapted for use as the driving wheels of traction engines or other heavy vehicles.

It is an object of the invention to provide a traction wheel which is formed with yielding ground engaging devices adapted to give the wheel the proper amount of traction and preventing the same from slipping or swerving in loose or broken ground.

It is also an object of the invention to provide a traction wheel which is formed with spring mounted ground engaging projections which normally embed themselves in loose or tilled ground, but which are not intended to force themselves into hard surfaces such as roads, paved streets or the like.

In the accompanying drawing forming a part of this specification, Figure 1 is a top plan view of a traction engine having driving or traction wheels made in accordance with the present invention. Fig. 2 is an enlarged sectional view taken upon the line $a$—$b$ of Fig. 1. Fig. 3 is a fragmentary sectional view upon the same line as that of the section shown in Fig. 2, but showing the ground engaging projections held at their inner positions so as not to engage the ground. Fig. 4 is a detail sectional view taken upon the line $c$—$d$ of Fig. 3.

The details and features of the invention will now be specifically described, reference being had to the drawing in which—

1 indicates a traction engine having guiding wheels or rollers 2 and traction wheels or rollers 3. A propelling engine or motor 4 of any desired type may be mounted upon the vehicles for communicating movement to the driving or traction wheels 3 through any desired transmission, gearing and mechanism.

The construction of the traction wheels forms the important features of the invention and the said traction wheels may be of any desired type, each being a central broad roller, with ground engaging devices mounted upon one edge or the other thereof or each wheel may be of the split rim type, the ground engaging portions being arranged centrally or between the said rims. The latter form of wheel being the preferred one is the form illustrated in the drawing. Each of said wheels 3 is constructed with a drum portion 5 connected by webs 6 with a hub 7, the said hub being adapted to move upon a shaft 8 carried by the traction engine. On each side of the drum portion 5 hollow rims 9 are formed, the tread surfaces of which are of considerably larger diameter than the diameter of the said drum 5. The rims may be of any desired type and the space between them outside the periphery of drum 5 is occupied by the ground engaging traction means which is now to be described.

The traction or ground holding means preferably consists of a series of projections or detents 10 which are arranged to project beyond the adjacent peripheries of the rims 9. These projections 10 are preferably carried by springs 11 which are of the flat type and are secured at their inner ends to the drum 5 by bolts 12 or other rigid securing means. The projections 10 are secured at points near the outer free ends of the flat springs 11. The detents are generally formed by blocks made triangularly in cross-section and have securing flanges 13 at their bases by which they may be bolted, riveted or otherwise secured to the springs 11. The blocks are arranged so that one of their triangular edges projects outwardly between the rims 9 when the springs are in their outer positions thus presenting sharp ground penetrating edges. These edges and the body portions are usually made the full width of the springs 11 though of course they may be made narrower and brought to a sharper point either in a pyramidal or conical form within the spirit of the invention. The wide edge blocks are however, preferable since they present a strong wearing edge and obtain a firm hold upon the ground. The springs 11 are limited in their outer movement by means of bars or rods 14 which extend from one rim 9 to the other near the peripheral surfaces thereof and engage the free ends of the springs just beyond the projections 10.

While it is sufficient usually to place limiting rods 14 in such a position as to engage and retain the extreme outer ends of the springs 11, other limiting rods 17 may also be employed which are set to engage the blocks carrying the projections 10 inside the said projections. These additional rods will always insure the proper retention of the projections 10 when the traction wheel is in operation, so that the said projections will not be forced circumferentially of the wheel. The springs 11 are usually made of sufficient strength and stiffness to force them firmly against the ground and to cause them to penetrate loose or tilled ground as when using the vehicle or traction engine in agricultural pursuits. When the engine or other vehicle is to be moved upon roads or pavements where it is not desired that the projections 10 shall engage the ground, the springs 11 are forced inwardly and retaining rods 15 are inserted through coinciding apertures formed in the rims of the wheel as clearly shown in Figs. 3 and 4. Cotterpins 16 or other removable members may be employed for holding the said rods 15 in place. The said rods 15 engage the ends of the springs 11 when they are depressed and hold them into such position that the projections 10 do not engage the ground or extend beyond the peripheries of the rims 9. When the vehicle is to move upon loose or tilled soil, the rods 15 are removed and the springs 11 will carry the ground engaging projections 10 to their outer positions as shown in Fig. 2. The arrangement of the springs 11 is such that the drum 5 will pull upon the same from the bolted ends thereof in securing the necessary traction for the drive wheels. The said springs 11 are usually made however, of sufficient strength and stiffness to permit of the wheels being driven in the reverse direction without danger of breaking them, the projections 10 engaging the ground in the same manner as before. The traction engine illustrated in Fig. 1 of the drawing is preferably driven with the traction wheels 3 at the front, the guide wheel or roller 2 being at the rear, hence the springs 11 are therefore arranged as shown in Fig. 2, so that the projections 10 will pull upon the springs instead of pushing them, especially when the traction engine is being used to draw other vehicles or implements over the ground. The projections 10 are preferably made as shown in Figs. 1, 2 and 3 of the drawing with inclined faces for the reason that the said faces tend to support the wheel in loose ground as well as to propel it thereon.

What is claimed is:

1. A traction wheel comprising a drum, a rim portion outside the same, a series of tangential springs carried by the said drum and having ground engaging points at their free ends extending beyond the rim portion for securing the necessary traction for the wheel.

2. A wheel for traction engines having a depressed rim portion and a ground supporting rim portion, springs secured to said depressed rim portion at one end and at the other end carrying pointed members extending beyond the ground supporting rim portion and adapted to engage the ground and penetrate the same for securing the proper traction for the wheel.

3. A driving wheel for traction engines having a rim portion with a depressed surface, springs secured at their inner ends to said depressed surface and triangular blocks secured to the outer ends of said springs, their sharp edges being adapted to engage the ground and means for limiting the outward movement of the said springs.

4. A driving wheel for traction engines having a peripheral portion provided with springs secured thereto at their inner ends, ground engaging detents carried by their outer ends, transverse bars upon the periphery of the wheel for limiting the outer movement of the springs, and removable rods adapted to be inserted in apertures in the rim of the wheel for holding the springs at the inner extremities of their movements so as to hold the said detents out of ground engaging position.

5. A traction wheel for vehicles, comprising a supporting peripheral portion, a ground engaging point adjacent to said peripheral portion, a laterally extending resilient arm for yieldably supporting said point exterior of said peripheral portion, and means for retaining said point interior of said peripheral portion.

6. A traction wheel for vehicles comprising a hub portion and a peripheral supporting portion, laterally extending resilient arms secured at one end between said hub and peripheral portions, and ground engaging points carried by the other end of said arms and adapted to project beyond the peripheral portions, said arms overlapping so that a portion of one arm lies in the radial plane of the point on the adjacent arm.

7. A traction wheel for vehicles, comprising a peripheral supporting portion, ground engaging points adjacent to said peripheral portion, and overlapping laterally extending arms for yieldably supporting said points to project beyond said peripheral portion.

In witness that I claim the foregoing I have hereunto subscribed my name this 12th day of August, 1911.

KENNETH N. AVERY.

Witnesses:
 E. STADTMAN,
 EARLE R. POLLARD.